April 16, 1929.   W. J. GARRETT   1,709,259
COTTON BLOCKER
Filed Feb. 7, 1928

Inventor
William J. Garrett,
By J. Stanley Burch
Attorney

Patented Apr. 16, 1929.

1,709,259

UNITED STATES PATENT OFFICE.

WILLIAM J. GARRETT, OF MESQUITE, TEXAS.

COTTON BLOCKER.

Application filed February 7, 1928. Serial No. 252,511.

My invention relates to an improved implement for blocking out and cross-cultivating rows of cotton or the like.

The primary object of the invention is to provide an improved implement adapted to be drawn across the field of cotton in a direction transverse to that in which the rows of cotton extend and embodying a pair of plow blades spaced apart so that such plants as pass between the plows remain, while those that are engaged by the plow blades are cut and destroyed.

A further object is to provide means for adjusting the plows toward or away from each other for different sizes and spacing of the blocks.

A still further object is to provide a colter wheel centrally between and in advance of the plow blades for cutting any trash or undesirable vegetation which it encounters in the blocks.

Still another object is to provide an implement of the above kind which is simple and durable in construction, efficient in operation, and capable of being readily adjusted.

The invention consists in the novel form, combination and arrangement of parts hereinafter more fully described, shown in the accompanying drawing and claimed.

Figure 1:
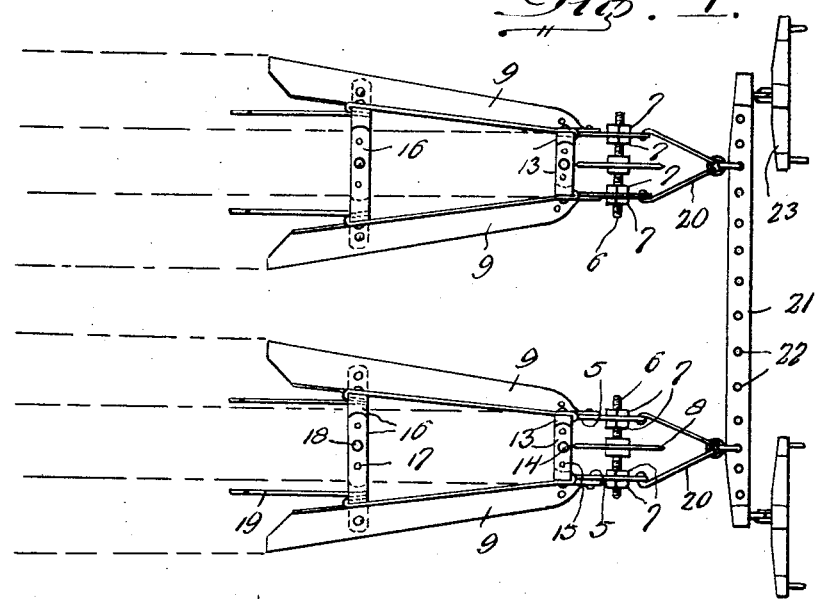
Figure 1 is a top plan view of a cotton blocking implement composed of a plurality of blocking units or plows embodying the present invention.
Figure 2:
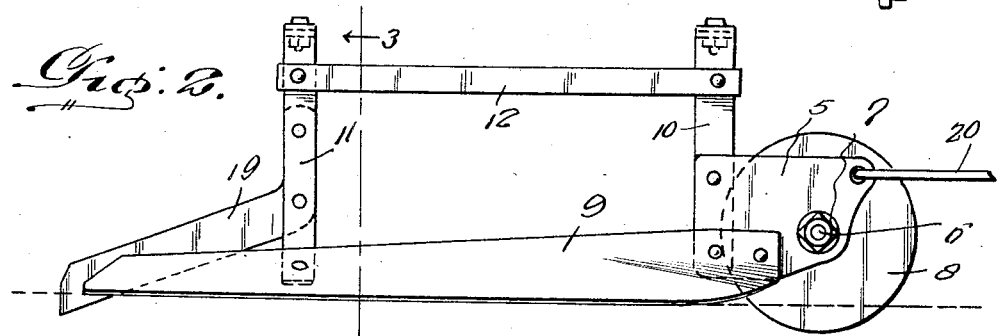
Figure 2 is an enlarged side elevational view of one of the blocking units or plows.
Figure 3:
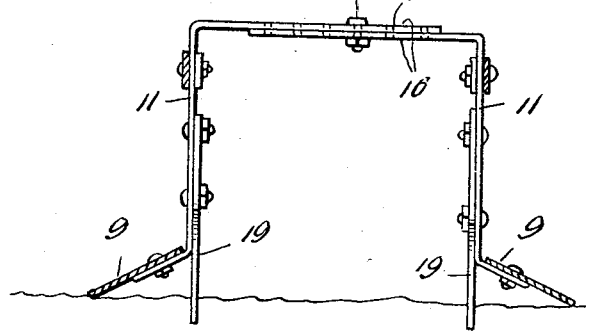
Figure 3 is a transverse section on line 3—3 of Figure 2.

Referring more in detail to the drawing, each blocking unit or plow consists of a pair of spaced vertical, supporting plates or shoes 5 having transversely alined openings in which are loosely engaged the ends of an axle 6 having pairs of nuts 7 adjustably threaded thereon at opposite sides of said plates, whereby the latter may be adjusted toward or away from each other to the desired spaced relation, a rolling colter disk 8 being journaled on the axle 6 midway between the plates 5, as shown. Secured to the outer sides of the lower rear portions of the plates 5 are laterally inclined and rearwardly diverging plow or cutting blades 9 which gradually decrease in lateral inclination in a rearward direction to nearly reach a horizontal position at their rear ends and thereby adapt them to work a slight distance beneath the surface of the soil to break the crust and engage the stalks or roots of the plants so as to sever and destroy the same.

Attached to the inner sides of the plates 5 at the rear ends of the latter are uprights 10, and attached to the rear end portions of the blades 9 are similar uprights 11. The uprights 10 and 11 at each side are connected by longitudinal horizontal brace bars 12, and the uprights 10 have inwardly projecting horizontal upper ends 13 which are disposed in overlapping relation and adjustably connected by a bolt 14 adapted to be selectively passed through any desired alined ones of the longitudinal series of apertures 15 provided in the ends 13 of the uprights. In a like manner, the uprights 11 have inwardly projecting overlapping horizontal upper end portions 16 which are formed with longitudinal series of openings 17 for selective alinement and reception of a bolt 18. It is thus apparent that the blades may be readily adjusted toward or away from each other in accordance with the sizes and spacing of blocks desired as well as to accord with the relative adjustment of the plates 5, said blades being effectively braced and steadied in their adjusted positions. This construction also permits flexing of the blades to vary their degree of rearward divergence to a limited extent and vary the size of spaces between blocks. To further steady the blades 9 and guard against lateral drifting of the unit or plow at its rear end, rearwardly inclined guiding and colter blades 19 are attached to and extend rearwardly from the rear uprights 11 to points behind and below the lower edges of the blades 9. The blades 19 are disposed outwardly of the planes of the plates 5, and they therefore do not damage the blocks of cotton left standing, although they assist in the plant destroying and cultivating between the blocks.

A bail 20 is attached to the forward ends of the plates 5 for facilitating connection of the plow or unit to draft means.

An implement may consist of one or any desired number of the plows or units, but when a plurality of the units are employed, the adjacent blades 9 of adjacent units are spaced to leave blocks of cotton between them as indicated in Figure 1. In this figure two units are connected to a doubletree 21 having a longitudinal series of openings 22 whereby the units may be adjusted and hitched at any desired distance apart to said doubletree. In this instance, singletrees 23 are carried by the ends of the doubletree for connection with draft animals.

From the above, it will be seen that as the implement is drawn over the field of cotton transversely of the rows of plants, the blades 9 will cut the roots of the plants at intervals as they pass across the rows, such plants as occur in the rows between the plates 5 not being materially disturbed by the colter wheel 8 and not at all by the blades 9 and 19.

Minor changes may be made within the spirit of the invention as claimed.

What I claim as new is:

1. A cotton thinning implement consisting of spaced vertical supporting shoes of plate-like form, rearwardly extending and diverging cutting blades attached to said shoes, means connecting said shoes for relative lateral adjustment and a colter wheel journaled centrally between said shoes.

2. A cotton thinning implement consisting of spaced vertical supporting shoes of plate-like form, rearwardly extending and diverging cutting blades attached to said shoes, means connecting said shoes for relative lateral adjustment and a colter wheel journaled centrally between said shoes, said colter wheel having a supporting axle adjustably connecting said shoes for permitting such relative lateral adjustment thereof.

3. A cotton thinning implement consisting of spaced vertical supporting shoes of plate-like form, rearwardly extending and diverging cutting blades attached to said shoes, means connecting said shoes for relative lateral adjustment, and means connecting the rear ends of said cutting blades for relative lateral adjustment, said connecting means embodying pairs of uprights attached to the shoes and the blades and adjustably connected together at their upper ends.

4. A cotton thinning implement consisting of spaced vertical supporting shoes of plate-like form, rearwardly extending and diverging cutting blades attached to said shoes, means connecting said shoes for relative lateral adjustment, means connecting the rear ends of said cutting blades for relative lateral adjustment, said connecting means embodying uprights attached to the shoes and the blades and having inwardly projecting adjustably connected overlapping upper ends, and rearwardly inclined guiding and colter blades attached to and projecting rearwardly from the uprights of the cutting blades and depending below the latter.

In testimony whereof I affix my signature.

WILLIAM J. GARRETT.